Dec. 14, 1926.
A. T. POTTER
1,611,064
WINDSHIELD CONSTRUCTION
Filed July 14, 1924
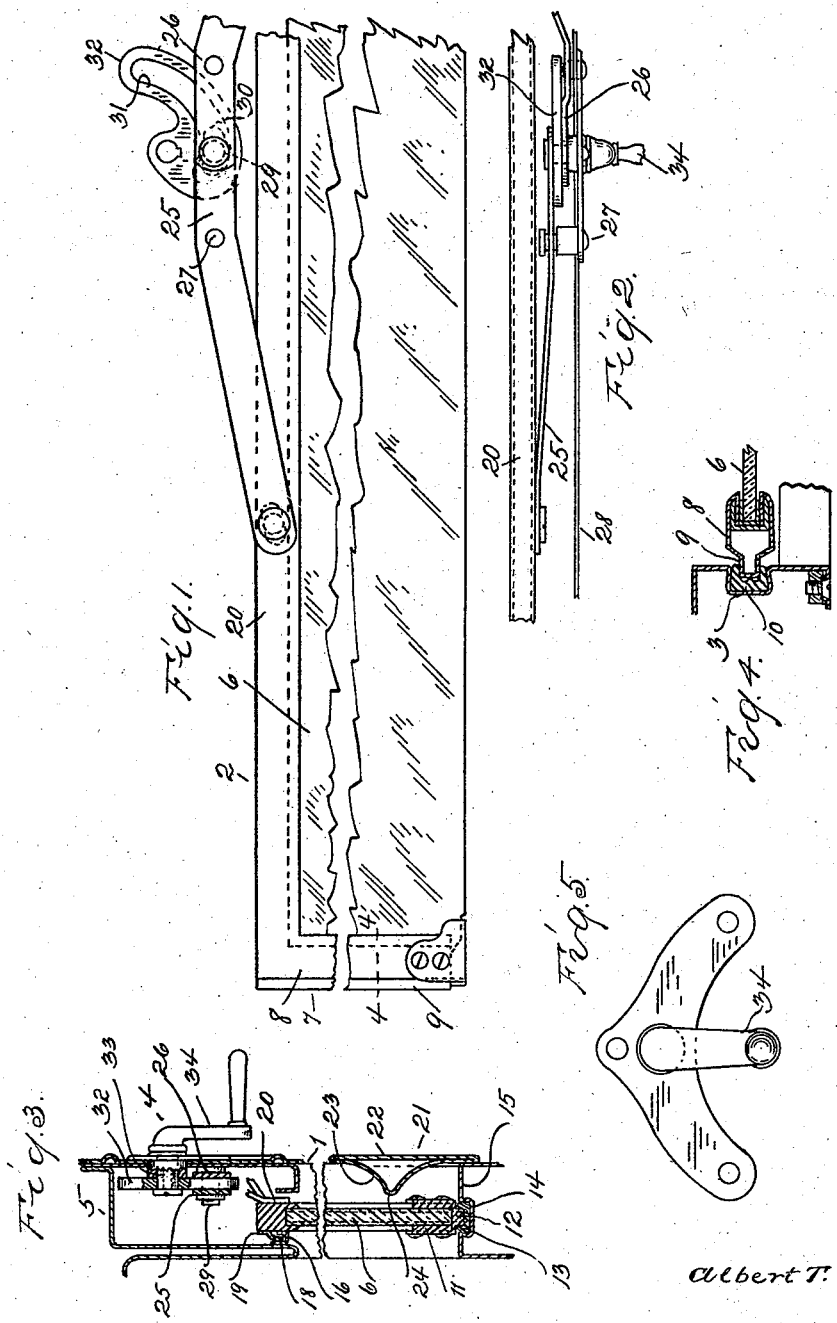
Inventor
Albert T. Potter
By Whittemore Hulbert Whittemore
+ Belknap
Attorneys Patented Dec. 14, 1926.

1,611,064

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD CONSTRUCTION.

Application filed July 14, 1924. Serial No. 725,979.

This invention relates generally to windshield constructions and refers more particularly to those designed for use with closed bodies of motor vehicles.

One of the essential objects of the invention is to provide a light and durable windshield that is adapted to be moved vertically in its supporting frame for admitting a current of air into the vehicle body.

Another object is to provide simple and effective means for distributing the current of air admitted by the windshield, in different directions within the vehicle body.

A further object is to provide simple and practical mechanism that is adapted to be operated by a suitable crank for actuating the windshield and that is also adapted to hold the windshield in any adjusted position.

Still another object is to provide a strong and durable construction which can be manufactured at a comparatively low cost.

With the above and other objects in view, the invention consists in certain novel features of construction, combinations and arrangements of parts as will be more fully described and particularly pointed out in the appended claims.

In the accompanying drawing;

Figure 1 is a fragmentary front elevation of a windshield construction embodying my invention.

Figure 2 is a top plan view of the construction shown in Figure 1.

Figure 3 is a vertical sectional view through the construction shown in Figure 1.

Figure 4 is a sectional view taken on the line 4—4 of Figure 1.

Figure 5 is a detail elevation of a reinforcing plate and crank shown in Figures 2 and 3 of the drawing.

Referring now to the drawing in which like characters of reference designate corresponding parts throughout the several views, the numeral 1 designates a frame surrounding a windshield 2, that is adapted to be moved vertically in suitable guides 3 at the sides of the frame by operating mechanism 4 located preferably in a casing 5 at the upper end of the frame. This frame may be constructed from any suitable material and is preferably located at the inner end of the usual cowl (not shown) of the vehicle body.

The windshield 2 is preferably formed of a single sheet of glass 6 which is enclosed within a suitable metallic frame 7. The end rails 8 of this frame are preferably provided with central longitudinally extending projections 9 that engage suitable channel-shaped weather strips 10 in the channel guides 3 at the sides of the frame 1, while the lower rail 11 is preferably provided with a central longitudinally extending projection 12 that normally seats within a yieldable channel shaped weather strip 13 disposed within a correspondingly shaped channel 14 in the base 15 of the frame 1. At the top of the frame 1 is a channel shaped strip 16 that is preferably secured to the front wall of the casing 5 and is adapted to receive the off-set portion 18 of a weather strip 19 secured to the top rail 20 of the windshield frame. Thus an effective weather-tight joint is provided between the frame 1 and the windsheld when the latter is in closed position.

In order that the current of air admitted by the windshield may be distributed in different directions within the vehicle body, I preferably provide a deflector 21 that is secured to the side bars of the frame 1 at the lower end thereof. This deflector may be constructed of any suitable material and is preferably substantially triangular shape in cross section. As shown, the deflector is preferably formed from sheet metal which is bent to provide a vertical back portion 22 and a forwardly projecting longitudinally extending substantially V-shaped portion 23. The deflector may be any height desired but is preferably substantially equal in height to the depth of the casing 5 so that the lower edge of the windshield cannot be raised above the upper edge of the deflector. Hence, the windshield controls the quantity of air that may pass through the frame 1, while the deflector 21 controls the distribution of such air within the vehicle body. Should it be desired to direct air toward the floor of the vehicle, the windshield may be raised until the lower edge thereof is substantially even with the forward edge 24 of the deflector. When the windshield is raised above the forward edge 24 of the deflector, the current of air admitted will be divided so that a portion will be deflected upwardly and another portion will be deflected downwardly simultaneously.

In order that the windshield may be raised or lowered easily and quickly, the operating mechanism 4 preferably comprises a pair of complementary levers 25 and 26 respectively that are pivotally connected at their outer ends to the top rail 20 of the windshield, and are fulcrumed adjacent to their inner ends upon suitable pivot pins 27 secured to the inner wall 28 of the casing 5. The inner ends of the levers 25 and 26 are preferably spaced laterally apart and are connected by a pin 29 that engages aligned slots 30 in the levers. This pin 29 also engages a slot 31 in a cam 32 that is disposed between the levers and is nonrotatably mounted on the shank 33 of a suitably operating crank 34. Thus, rotation of the crank 34 in one direction will cause the cam 32 to swing in an arc of a circle and lower the pin 29 with respect to the fulcrum pins 27 so that the outer ends of the levers 25 and 26 will raise the windshield. Likewise, rotation of the crank 34 in the opposite direction will cause the cam 32 to raise the pin 39 with respect to the fulcrum pins 27 so that the outer ends of the levers 25 and 26 will lower the windshield. Inasmuch as the pin 29 carried by the levers 25 and 26 engages the slot 31 in the cam between the fulcrum pins 27 and is disposed in the vertical plane of the shank 33 of the crank, it will be readily apparent that the windshield will be locked in any position of adjustment.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a frame, of a closure member movable a predetermined distance vertically in the frame to allow a current of air to pass through the frame, and a deflector secured to the inside of the frame having means for distributing the current of air in different directions, the height of said deflector being substantially equal to the distance the closure is adapted to be raised.

2. The combination with a frame, of a windshield movable vertically in the frame to allow a current of air to pass through the frame, and a deflector secured to the frame having a V-shaped portion for distributing the current of air in different directions.

3. The combination with a frame, of a windshield movable vertically in the frame to allow a current of air to pass through the frame, and a deflector extending across the frame having a longitudinally extending forwardly projecting substantially V-shaped portion for distributing the current of air in different directions.

4. The combination with a frame, of a deflector secured to the ends of the frame at the base thereof and having a longitudinally extending substantially V-shaped portion projecting within the frame, and a windshield movable a predetermined distance vertically in the frame to allow a current of air to pass through the frame, the distance the windshield may be moved being less than the height of the deflector whereby the current of air will be distributed by the latter in different directions.

5. The combination with a frame, of a single closure member for the frame, means for moving the closure member vertically in the frame to permit a current of air to pass through the frame, and a substantially V-shaped deflector extending across the frame for distributing the current of air in different directions.

6. The combination with a frame, and a vertically movable closure member in the frame, of means for actuating the closure member including fulcrumed levers pivotally connected to the closure member, a pin connecting said levers between the fulcrums therefor, a cam engaging said pin, and means for moving said cam.

7. The combination with a frame, and a vertically movable windshield in the frame, of means for actuating the windshield, including fulcrumed levers connected to the windshield, a pin connecting said levers between the fulcrums therefor, a cam between said levers having a slot receiving said pin, and a crank for operating said cam.

8. The combination with a frame and a vertically movable closure member therein, of a casing at the upper end of the frame, means located in said casing for operating the closure member, said means including a pair of complementary levers pivotally connected to the closure member, a pin carried by said levers between the fulcrums therefor, and a cam disposed between said levers and having a slot receiving said pin.

In testimony whereof I affix my signature.

ALBERT T. POTTER.